Sept. 7, 1948.     N. C. PRICE     2,448,824
ROTARY TURBINE-TYPE HYDRAULIC COUPLING
Filed Nov. 24, 1944     4 Sheets-Sheet 1
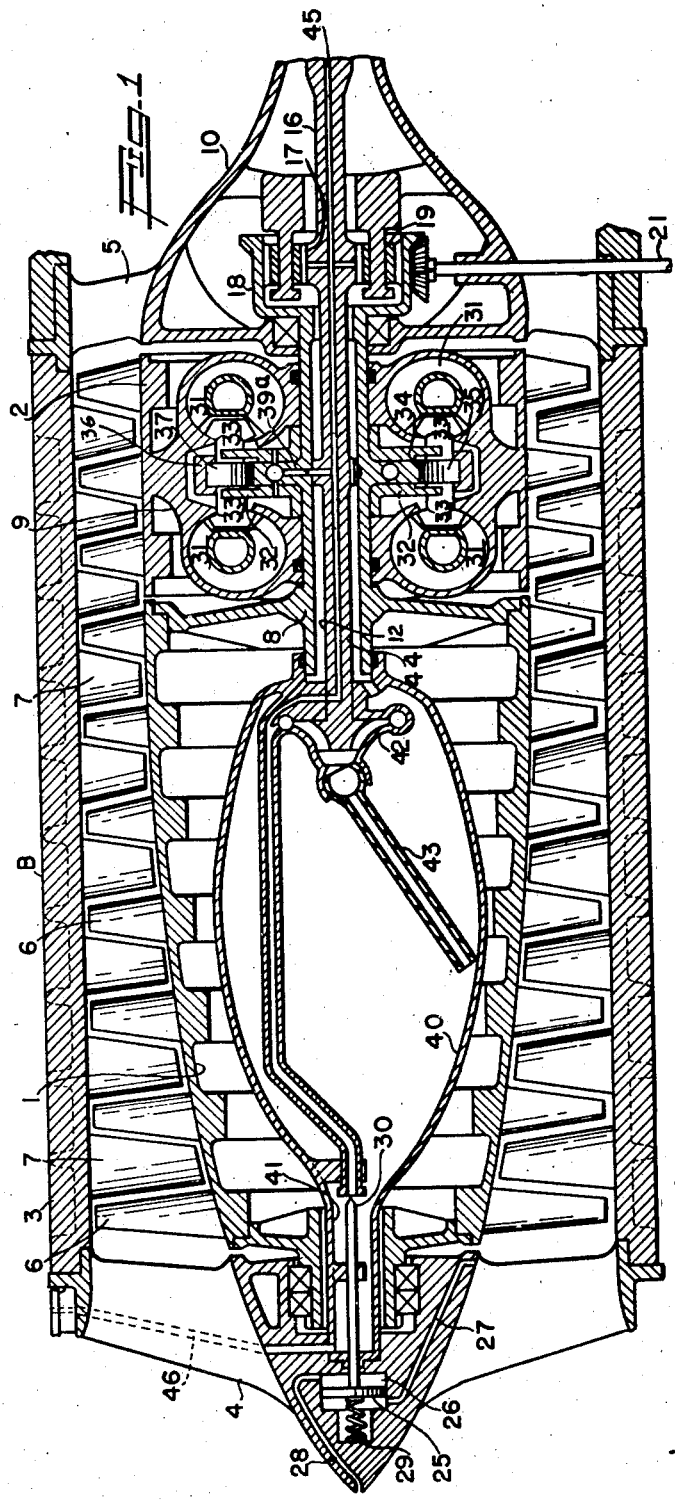
INVENTOR.
NATHAN C. PRICE
BY
George C. Sullivan
AGENT

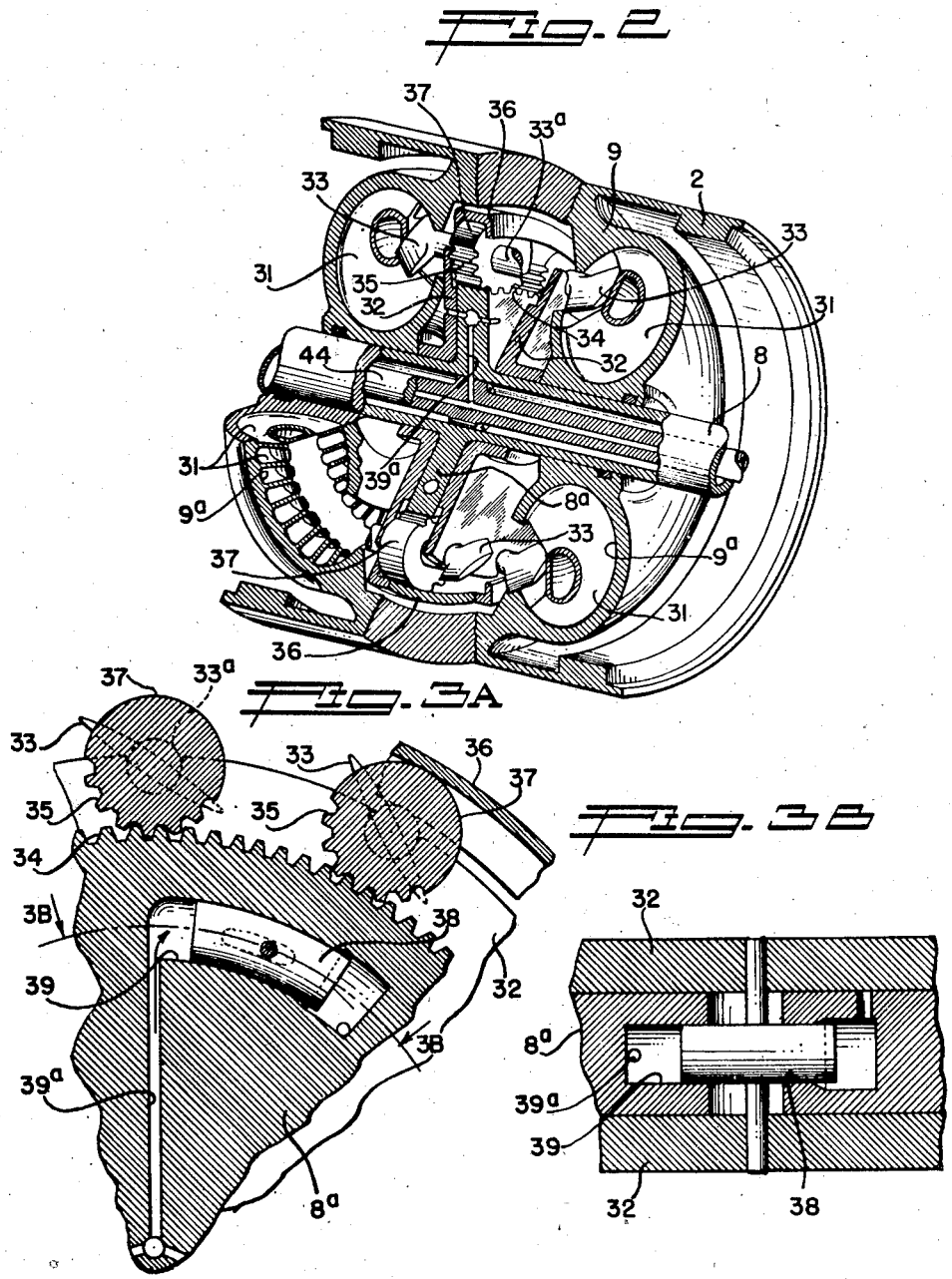

Sept. 7, 1948.  N. C. PRICE  2,448,824
ROTARY TURBINE-TYPE HYDRAULIC COUPLING
Filed Nov. 24, 1944  4 Sheets—Sheet 3
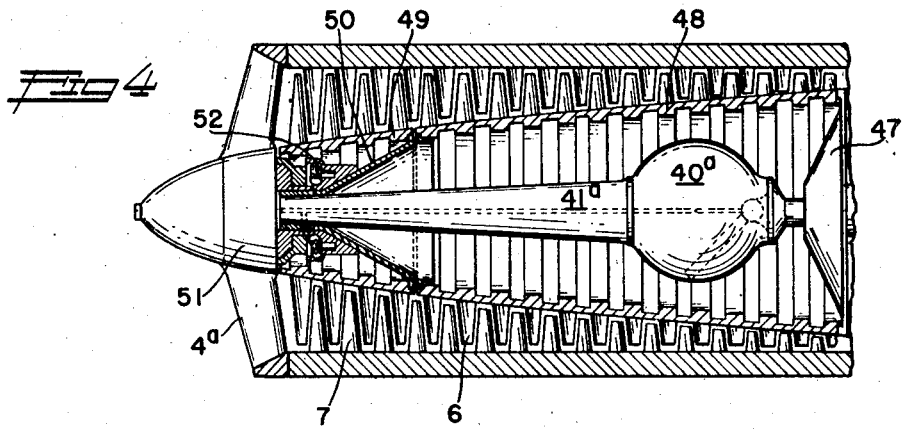
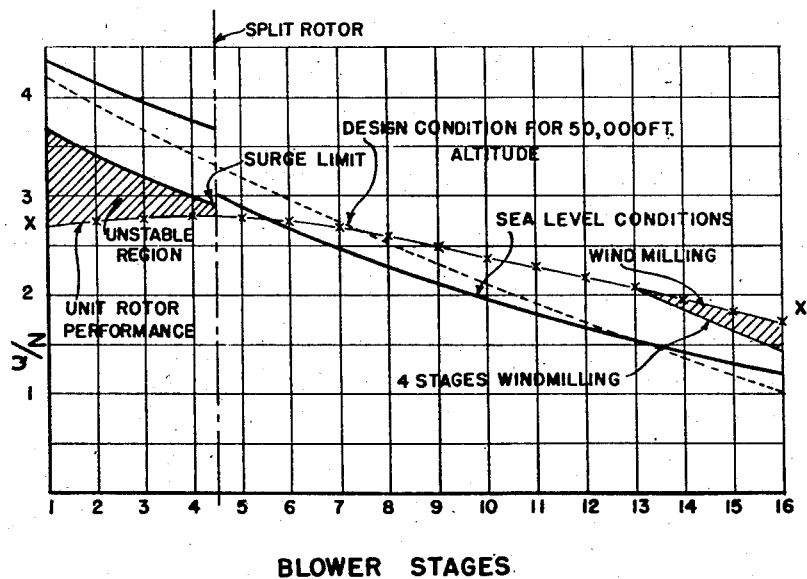
INVENTOR.
NATHAN C. PRICE
BY
AGENT Sept. 7, 1948.   N. C. PRICE   2,448,824
ROTARY TURBINE-TYPE HYDRAULIC COUPLING
Filed Nov. 24, 1944   4 Sheets-Sheet 4
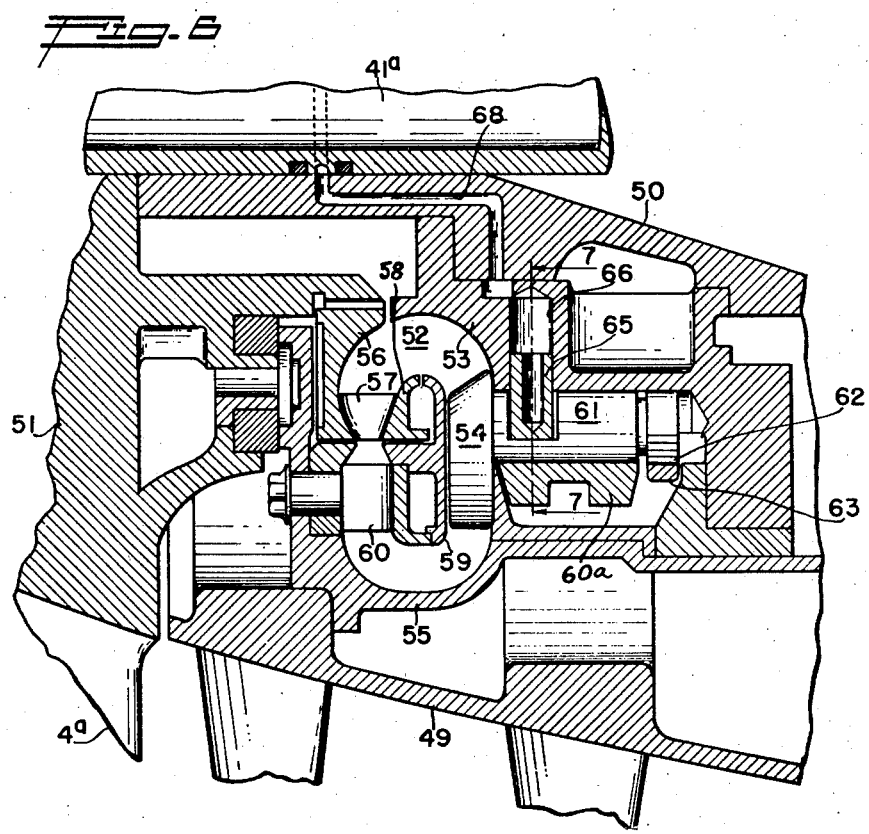
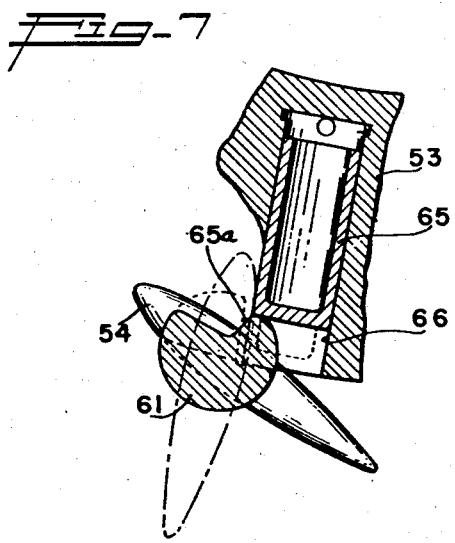
INVENTOR.
NATHAN C. PRICE
BY
AGENT Patented Sept. 7, 1948

2,448,824

UNITED STATES PATENT OFFICE 2,448,824

ROTARY TURBINE-TYPE HYDRAULIC COUPLING

Nathan C. Price, Hollywood, Calif., assignor to Lockheed Aircraft Corporation, Burbank, Calif.

Application November 24, 1944, Serial No. 564,993

12 Claims. (Cl. 60—54)

1

This application is a continuation in part of my copending application entitled Auxiliary steam powerplant for aircraft, Serial Number 452,841, filed July 30, 1942, since matured into Patent No. 2,379,183, issued June 26, 1945, relating to supercharging engines and deicing wings in high altitude aircraft. The present invention embraces a technique for improving the operational characteristics of fluid compressors and superchargers of the change-of-velocity type at varied capacities and high altitudes applicable to internal combustion engines or gas turbine power plants.

In high altitude aircraft it has not been possible heretofore to provide a supercharger or air compressor of good efficiency, which has a stable range broad enough to maintain the wide range of flow required at high supercharger or compression ratios. Axial flow blowers in particular, which should potentially provide the highest peak efficiency and which, therefore, are most attractive basically, have an especially narrow stable range of operation and narrow range of high efficiency operation even with variable speed control provided, especially when the number of stages is great.

An airplane operating at 30,000 ft. altitude with internal combustion engines for example, requires the development of full rated power at high manifold pressure during climb and in the event of failure of one of its engines. On the other hand, the supercharger is called upon to deliver approximately the same high compression under the conditions of lowest cruising power at best economical speed. Then the propeller is placed in highest pitch and the fuel mixture is leaned down as far as possible with the engine rotating at 40% of maximum speed.

As a result of the latter, it has been found necessary in new airplane designs for meeting varied power conditions at high altitude, to install two separate supercharger drives, and controls therefor, one of which superchargers can be stopped when the cruising power condition is established. This is costly from the standpoint of weight and complication. Furthermore, the pilot must manually manipulate the controls for change-over from double to single supercharger operation, or vice versa. Even if automatic controls accomplish this task the transition is accompanied by an abrupt change of conditions which is bad from the control standpoint.

In this invention the above situation is avoided by providing means subject to automatic control, for regulating the relative speed of separate sections of the rotor of a single multi-stage supercharger, in the cases illustrated of the axial flow type. The particular mechanical embodiments of the invention therewith illustrated also include other novel cooperative features in respect to the construction of a variable speed drive mechanism and lubrication system forming a part of the blower.

It is an object of this invention to extend the stable high efficiency range of superchargers or air compressors over a wider range of air discharge quantities at high compression ratios to improve power plant economy, to reduce the required amount of after-cooling, to avoid the use of dual separate blowers and drives therefor, and to avoid the necessity of using "step" controls.

A further object of this invention is to provide simple and effective automatic controls to appropriately regulate supercharger output.

It is also an object of this invention to provide apparatus to accomplish the foregoing with a minimum amount of weight and with maximum dependability and compactness.

Other and further important objects of this invention will be apparent from the disclosures in the specification and the accompanying drawings.

This invention in its preferred form is illustrated in the drawings and hereinafter more fully described.

In the drawings—

Figure 1 is a section of the supercharging unit of the system, along the main axis thereof.

Figure 2 is a fragmentary perspective section through the fluid coupling drivingly connecting the two sections of the supercharger together.

Figure 3A is an enlarged fragmentary section through the hydraulic unfeathering control for the adjustable vanes of the hydraulic coupling.

Figure 3B is a fragmentary section on the line 3B—3B of Figure 3A.

Figure 4 is an axial section, with parts shown in elevation of a modified form of compressor embodying another form of the features of this invention.

Figure 5 is a chart illustrating the gain in flexibility of range due to the present invention.

Figure 6 is an enlarged fragmentary detail of the hydraulic coupling shown in Figure 4.

Figure 7 is a section on the line 7—7 of Figure 6 showing the pressure control of the angle of the vanes.

The first form of the invention disclosed herein relates to a multi-stage compressor or supercharger to be driven by an auxiliary steam power plant deriving heat from the engine exhaust, as more fully described in my prior application Serial Number 452,841, filed July 30, 1942 (now Patent No. 2,379,183), from which this form of the present invention has been divided. As an example of such an installation in connection with a steam generation system producing 3,000,000 B. t. u. per hour of steam heat from the engine exhaust heat, approximately 320 brake horsepower will be made available for air compression in the supercharging unit, which is generally cylindrical in shape, measuring about one foot in diameter and two feet in length in a representative unit of enough power to supercharge a 2,500 horsepower engine at 25,000 ft. altitude, to full rated power.

In Figure 1, illustrating the supercharging unit, a directly driven axial blower rotor 1 is supported by bearings within the outer casing 3, by an inlet spider 4 and an outlet spider 5. The aforesaid spiders serve not only as supports, but also as counter vanes 7 to improve efficiency of airfoil rotating vanes 6. A free-wheeling rotor 2 is mounted on hub 8 at the rear of rotor 1, and engaged thereto at certain times by a hydraulic coupling 9 to be described later.

The compressed air outlet from the blower passes axially around a streamlined cone 10 surrounding a drive shaft 16 for driving a planetary sun gear 17 inside the hub of the outlet spider 5. The rotor hub 8 bears a ring gear 18 engaging planet pinions 19. In a representative case shaft 16 rotates at a maximum speed of 46,000 R. P. M. and the planetary reduction provided, through gears 17, 18 and pinion 19 cause rotation of rotor 1 at a maximum speed of 16,500 R. P. M. Thereby efficient operating pitch line velocity is provided for the multi-stage axial flow blower, and for the single stage driving turbine (not shown), each operating at its optimum speed.

It is apparent that rotor 1 operates at a constant speed ratio with respect to shaft 16. At maximum altitude of the aircraft and at maximum rotative speed of the engine being supercharged, rotor 1 operates at 16,500 R. P. M. and at 31 inches of mercury absolute discharge air pressure, for example. If the engine speed is now reduced by increasing propeller pitch and by leaning the fuel air ratio, the blower characteristic will not be sufficiently broad to permit the consequent decrease in air flow, without unstable operation.

Therefore, a control is provided to progressively engage rotor 2 to hub 8 in the amount required to provide an excess compression through the supercharger as a whole, as described in my prior application. Then at the lower speed the blower produces the required compression ratio at the reduced air flow without departing from a stable range of operation at high efficiency. With this arrangement, an efficiency of compression not less than 85% based on adiabatic cycle, can be obtained from 100% rated air flow down to 40% rated air flow.

Figure 1 illustrates diagrammatically the control for the speed of rotor 2. An air piston 25 within a cylinder 26 of the spider 4 is exposed on the front side to a pressure tap 27 lying opposite a large diameter portion of the hub of the spider 4 where the air velocity is relatively high, and on the rear side to the apex of the hub of the spider 4 to a pressure tap 28. It is apparent that the piston 25 has air differential pressure acting upon it, tending to compress a spring 29, and to open a needle valve 30, to an extent dependent upon the rate of air flow into the blower inlet, in accordance with the well known Bernoulli's theorem.

Thus an increase in air flow tends to open valve 30, and a decrease in flow to close valve 30. The degree of bleeding of oil from the valve 30 as a result of control of positive by piston 25 regulates the degree of engagement of coupling 9.

Referring now to Figures 2 and 3A and B, showing the construction of the fluid coupling, rotor 2 is fixed to open-faced toroidal channels 9ª of the hydraulic couplings 9, which channels are provided with radial vanes 31 interrupted at the channel openings to provide spaces for adjustable impeller vanes 33. Between the open faces of the channels are a pair of spaced coaxial yoke members 32 journaled on the hub 8 and between which is disposed a disc-like extension 8ª of the hub 8 carrying gear teeth 34 on its periphery. The impeller vane shafts 33ª carry central gear segments 35 which mesh with the gear 34, the outer or uncut portions 37 of the gear segments forming rollers engaged in a channel-like floating ring 36 which takes the centrifugal forces acting on the vanes 33, their shafts 33ª, and the gear segments 35 and 37. The floating ring, as best shown in Figure 2, has the advantage that the member 9 may turn relative to it and the impeller vanes 33, when hydraulic slippage occurs in the coupling, without wearing of flat areas on the uncut portions of the gear segments 35. The shafts 33ª, on either side of the gear segments 35, rest in notches in the yoke members 32, so that relative movement between the yoke members 32 and the hub disc 8ª causes rotation of the vane shafts 33ª due to the geared engagement of the segments 35 and the gear 34, thus altering the angle of the impeller vanes 33 projecting into the toroidal channels of the fluid coupling.

Such relative motion between the yoke members 32 and the hub disc 8ª to unfeather the vanes 33 is accomplished by a plunger 38 pinned to the yoke members, and movable in a cylinder 39 by oil pressure fed thereto from a bleeder line 39ª dependent upon a source to be described. While the plunger is pinned to the yoke members 32 it is free to move relative to the hub disc 8ª because of elongated slots provided therefor, and such movement to the right in Figure 3A under the influence of oil pressure will tend to move the yoke members 32 clockwise, rolling the vane shafts 33ª clockwise on the gear 34, thus unfeathering the vanes 33. The natural resistance of the oil filled toroidal chambers causes feathering of the vanes through the lost-motion connection between members 32 and 8ª in the absence of sufficient oil pressure against the plunger 38, in which feathered position the vanes are substantially incapable of transmitting torque from the hub 8 to the rotor 2, and the latter free-wheels due to air flow from the main rotor 1. As the oil pressure is built up, the vanes unfeather into driving relationship in the toroidal chambers, thus transmitting maximum torque from rotor 1 to rotor 2.

Now assuming an intermediate pressure to be built up hydraulically in the cylinder 39, the vane pinions will receive a reaction from the yoke 32 so that the vanes unfeather and assume an intermediate angular position.

It is apparent that the effective driving angle of the vanes is a function of oil pressure in the cylinder 39. The greater the oil pressure in this cylinder, the greater the drive torque transmitted through the coupling.

Representative control oil pressure at the feathered position of the vanes may be 5 lbs. per square inch, which is sufficient pressure to properly circulate oil to the planetary gear-set and to the turbine bearing. As the needle 30 closes down the oil bleed at its seat, the control oil pressure may mount to 300 lbs. per square inch, for example, inasmuch as the oil passages leading to the planetary gear set and to the turbine bearing constitute an appreciable restriction to oil flow.

Oil flooding adjacent to the planetary gear-set is avoided by leakage from the blower discharge to the interior of a hollow shaft 12 forming an extension of the hub 8, which returns excess oil to a tank 40. The air is then vented from the top of the filler passage 46 to the atmosphere.

In consequence of the described relationships, it is apparent than an increase of air flow through the blower will cause a decrease of speed of rotor 2 with respect to rotor 1, and vice versa, a decrease of air flow through the blower will cause an approach of speed of rotor 2 to that of rotor 1.

Referring to Figure 1, an oil tank 40 shaped as an oblate spheroid is located within rotor 1. At the front end, tank 40 is supported from spider 4 by a torque tube 41; and at the rear end, tank 40 is journalled from hub 8. An oil pump casing 42 is attached to the rear end of tank 40, having an oil inlet 43 submerged in the tank oil supply. A pumping gear-set or centrifugal oil impeller is rotated within casing 42 by an extension 44 of shaft 16. The oil pump delivers oil to the bleeder line to valve 30 and to lubricating line 45 in shaft 16 for lubrication of the driving mechanism and planetary gear-set.

The oil tank 40 within rotor 1 occupies an otherwise wasted space, and permits the oil system to be fully enclosed in the supercharging unit avoiding the danger of external lines which may be broken. The oil is cooled by forced convection currents between the rotor 1 and the tank. The oil is so located that the lubrication system is always assured of positive priming when the airplane is operating at steep angle or in rough air.

The provision of variable angle vanes 33 in coupling 9 insures higher transmission efficiency than that of conventional hydraulic couplings. The vanes are preferably constructed of high speed foil shape, as in airplane wing sections. The vanes come to equilibrium at an angle somewhere between feathered angle and radial angle when the rotor 2 is being regulated at a speed less than that of rotor 1. At such time the power transmission efficiency tends to remain substantially as high as when the vanes are in their fully unfeathered or radial position. Another reason for using this type of construction in the coupling is that response to demand for change of relative speed between rotors 1 and 2 as almost instantaneous, contributing to accuracy of the control, yet the control is stable and does not overshoot. Conventional "scoop tube" couplings on the other hand, involve considerable lag due to necessity for filling or emptying the coupling with oil to obtain control, and at intermediate control position work on the principle of decrease of efficiency by permitting turbulent slip, which is necessarily erratic, to control speed, and are therefore not suitable for incorporation in a blower drive of the described type.

The foregoing described supercharging system is especially designed to maintain a constant manifold pressure in the power plant for both maximum power and for cruising at a lower engine R. P. M. Since the optimum efficiency of a conventional axial flow compressor cannot be had at both extremes of such a range of requirements, the floating stages of my axial flow compressor provide the necessary variation in capacity, and the control thereof is interrelated to the turbine and condenser coolant controls described in my companion application to provide a completely self contained and automatically controlled steam driven auxiliary unit capable of recovering the equivalent of over 13% of the rated power of the main engine of an equivalent load. Under cruising conditions the power recovery may rise to 16% of the cruising power due to the maintenance of manifold pressure as a result of the second stage compressor coming into action at a reduced turbine speed and volume of air flow.

The modified form of compressor disclosed in Figures 4 to 7, which is found to be particularly adaptable for air compression in aircraft power plants of the gas turbine type, as well as to engines of the piston type, differs from the foregoing principally in that the direct coupled and floating stages are transposed, so that the driving shaft 16 of Figure 1 is connected to a rotating diaphragm 47 in Figure 4 which drives the rear stages 48, generally at a constant governed speed, these direct driven stages in turn driving the floating stages 49 through a conical member 50 and a fluid coupling to be later described. Thus the variably driven or floating stages 49 of Figure 4 are located in advance of the power driven stages 48, and under certain conditions merely idle or may even "windmill" in the air stream flowing to the direct driven stages 48. The compressor of Figures 4 to 7 is shown as provided with sixteen stages, four of which are variably driven from and relative to the remaining twelve stages.

The conical member 50 is journaled at its front end about a forward tubular extension 41ª of an oil tank 40ª, both being supported at the hub 51 of a stationary spider 4ª, as in the previously described embodiment of this invention. In the modified form of the invention a single fluid coupling is used wherein a toroidal chamber 52 is defined by a driving casing 53 attached to the conical member 50 and carrying a plurality of adjustable vanes 54, a driven casing 55 carried by the floating rotor 49, and a stationary casing 56 supported from the hub 51 of the entrance spider 4ª. In this form of the fluid coupling the stationary casing 56 carries reaction vanes 57 within the toroidal chamber 52, which in turn support a portion 58 of a central core within the toroidal chamber, the balance 59 of the core being carried by fixed vanes 60 in turn supported from the driven casing 55.

The adjustable vanes 54 may be steel precision castings which are attached in offset relation to shafts 61 journaled in the driving casing 53 and held therein by a floating ring 61ª, and are provided with gear segments 62 at their opposite ends which mesh with a ring gear 63 which serves to synchronize the several vanes 54. The distribution of weights of the vane 54 and piston in combination may be controlled by varying wall thickness to lie on the swivelling center of the vane if desired. In the first described form of the invention a similar gear 34 provided the adjusting force for all the vanes 33, whereas in the modified version the individual vanes 54 are each operated by individual hydraulic actuators as most clearly shown in Figure 7, where a piston 65 in a chamber 66 acts against a cam surface 65ᵃ formed in the shaft 61. The piston 65 is subjected to the oil pressure of a pump corresponding to the pump 42 shown in Figure 1, through a connecting passage 68 leading from the pump outlet (not shown in Figure 6) to the chamber 66.

In this form of the device varying oil pressures from the pump 42 oppose the stream pressures of the oil in the toroidal passage, which latter oil pressures wash against the offset vanes 54 to turn them counterclockwise in Figure 7 against the downward pressure of the piston 65 acting against the cam 65ᵃ. Thus the fluid in the toroidal chamber 52 tends to feather the vanes 54 and thus allows the rotor 49 to float or idle in the air flow to the rotor 48, while the controlled oil pressure from the pump 42 acts to turn the vanes into their radial position wherein they act to transmit maximum power to the floating rotor. It will be noted that the addition of the fixed or reaction vanes 57 in the toroidal chamber converts the fluid coupling into a torque converter having an efficiency of over 90% for example over a speed range of floating rotor 49 with respect to main rotor 48 of from 40% to 110%, while the angularly adjustable vanes 54 provide for disconnection of the coupling. The torque convertor effect increases the power range of the coupling and can when provided with suitable blading forms reverse the flow of power under extreme conditions wherein the floating rotor is motored by the air flowing therepast.

The function of the split multiple stage rotor may be better understood from a consideration of the diagram of Figure 5. In this diagram the ordinates represent variations in volumetric flow in each blading row at constant R. P. M. in the main rotor. Actually both volume and R. P. M. may vary but it is more convenient to discuss the performance at a selected speed. The particular design illustrated is intended for optimum operation at a selected entrance air velocity, for example 900 feet per second, which might be the forward velocity of an airplane for example. For 50,000 feet pressure altitude the compressor delivery will be that shown by the dotted line in the chart, both rotors being driven at approximately 8,000 R. P. M. As a specific example the delivery would be approximately 9 pounds of air per second at 135 pounds per square inch pressure. With an increase of atmospheric pressure to 35,000 feet pressure altitude down to which the isothermal atmosphere still extends, the delivery from 16 stages would be allowed to rise to 18 pounds at 260 pounds pressure. If the 16 stages remained in unit relationship down to sea level pressures however, the theoretical delivery would be 57 pounds per second, to maintain all the various stages of the compressor at correct Q/N, within the stable range, but the increase in initial sea level ambient temperature and pressure at this pressure ratio would be untenable in the power plant from an overall cycle standpoint. Also the discharge temperature and pressure led into the gas turbine power plant would be excessive from practical standpoints. But by allowing the floating rotor to be gradually and continuously slowed as the pressure altitude decreases from 35,000 feet, the final sea level condition is reduced to 34 pounds at 490 pounds pressure. Thus design conditions required for operation above 35,000 feet pressure altitude can be met with 16 stages, as shown by the dotted line, while sea level conditions requirements are met by 12 stages as shown by the solid line, simultaneously maintaining the Q/N at each stage absorbing a considerable amount of power close to the design maximum efficiency value pertaining thereto, and within the stable range of operation.

It is apparent in Figure 5 that the Q/N of the blading in the split rotor at sea level is slightly greater but close to the design Q/N for operation at 50,000 feet altitude. The Q/N of the blading of the main rotor at sea level lies slightly below but close to the design Q/N for operation at 50,000 feet.

If the floating rotor construction were not used, the compressor characteristics would be defined by line X—X of Figure 5, in which it is apparent that the first four stages would be completely stalled and the last four stages would be placed in an inefficient windmilling condition.

It will be evident upon the foregoing that the proportion of stages to be directly driven at full speed is determined by the best cycle efficiencies at sea level, while the number of floating stages to be employed is determined by the extreme pressure or maximum pressure ratio at which satisfactory performance is desired. In other words, range of capacity can be tailored to the requirements of the installation without departing from the narrow range of maximum efficiencies or entering the certain regions of unstable operation characteristic of axial compressors.

Regardless of the number of blade rows the performance of an axial flow compressor of the conventional type is limited to a certain narrow flow range at each compression ratio, which conditions do not satisfactorily meet optimum cycle requirements for performance of internal combustion engines or gas turbine power plants with change of altitude, change of ambient air temperature, or change of airplane speed. If a conventional axial compressor is designed for a high compression ratio, many rows of blades are required. Such a compressor has good efficiency only at the design high speed point because at lower speeds even the reduction of air flow does not provide the correct ratio of volumetric flow to blade speed in all stages. This is because the ratio of volumetric flows at the inlet and outlet respectively is different for each condition of compression ratio and inlet air temperature. Under low rotative speed conditions the earlier stages tend to stall while the latter stages tend to "turbine" excessively with severe shock losses. This form of the invention provides means subject to suitable control to lower the speed of these earlier stages differentially with respect to the latter stages. This changes the stalling angle of incidence of the air striking the former blades to a normal, highly efficient angle of incidence. Simultaneously the reduction of speed of the earlier stages with respect to the speed of the latter stages lowers the volumetric flow into the latter stages so that the windmilling, negative angle of incidence of air striking the vanes is changed to a normal, highly efficient angle of incidence.

Having thus described my invention and the present preferred embodiments thereof, I desire to emphasize the fact that many modifications may be resorted to in a manner limited only by a just interpretation of the following claims.

I claim:

1. A hydraulic coupling consisting of a pair of spaced toroidal fluid filled containers having side openings facing each other, a drive shaft on which said containers are free to rotate, said containers being provided with fixed generally radial vanes internally, a circular spider in driven association with said shaft and extending between said containers, and variable angle vanes supported by and balanced relative to said spider and protruding into the openings in the fluid containers to form part of the fluid circulating path defined by the vanes therein.

2. Apparatus as defined in claim 1 and means responsive to the driving torque of said shaft for affecting the angle of attack of said variable angle vanes.

3. Apparatus as defined in claim 1, a first means responsive to the driving torque of said shaft for affecting the angle of attack of said variable angle vanes tending to feather said vanes with increase in torque, and a second means subject to external control for tending to unfeather said variable angle vanes in opposition to the effect of torque.

4. In combination with at least two rotating elements wherein one element is driven from the other at speeds varying relative thereto, a fluid coupling connecting said elements and means for varying the driving effect of said coupling whereby to vary the speed of the driven element, said coupling comprising a pair of spaced toroidal fluid filled containers connected to the driven element and having side openings facing each other, a plurality of substantially radial vanes in the toroidal spaces of said containers, said vanes being interrupted at the openings in the sides of the containers adjacent each other, a spider disposed between said containers and connected to the driving element, and variable angle vanes supported in balanced relationship on said spider and positioned in said containers in the spaces left by the interruptions in said radial vanes.

5. In combination with at least two rotating elements wherein one element is driven from the other at speeds varying relative thereto, a fluid coupling connecting said elements and means for varying the driving effect of said coupling whereby to vary the speed of the driven element, said coupling comprising a pair of spaced toroidal fluid filled containers connected to the driven element, a plurality of substantially radial vanes in the toroidal spaces of said containers, said containers being open and the vanes being interrupted on the sides of the containers adjacent each other, a spider disposed between said containers and connected to the driving element, variable angle vanes supported in balanced relationship on said spider and positioned in said containers in the spaces left by the interruptions in said radial vanes, and means for feathering and unfeathering said vanes including a hydraulic control system operatively connected to said variable angle vanes and so constructed and arranged as to control the angle of attack of said variable angle vanes by unfeathering the latter to vary the speed of the driven member relative to the driving member.

6. In combination with at least two rotating elements wherein one element is driven from the other at speeds varying relative thereto, a fluid coupling connecting said elements and means for varying the driving effect of said coupling whereby to vary the speed of the driven element, said coupling comprising a pair of spaced toroidal fluid filled containers connected to the driven element, a plurality of substantially radial vanes in the toroidal spaces of said containers, said containers being open and the vanes being interrupted on the sides of the containers adjacent each other, a spider disposed between said containers and connected to the driving element, variable angle vanes supported in balanced relationship on said spider and positioned in said containers in the spaces left by the interruptions in said radial vanes, and a control means operatively connected to said variable angle vanes and so constructed and arranged as to control the angle of attack of said variable angle vanes whereby to vary the speed of the driven member relative to the driving member.

7. In combination with at least two rotating elements wherein one element is driven from the other at speeds varying relative thereto, a fluid coupling connecting said elements and means for varying the driving effect of said coupling whereby to vary the speed of the driven element, said coupling comprising a pair of spaced toroidal fluid filled containers connected to the driven element, a plurality of substantially radial vanes in the toroidal spaces of said containers, said containers being open and the vanes being interrupted on the sides of the containers adjacent each other, a spider disposed between said containers and connected to the driving element, variable angle vanes supported in balanced relationship on said spider and positioned in said containers in the spaces left by the interruptions in said radial vanes, and means for feathering and unfeathering said vanes including a torque responsive means operatively connected to said variable angle vanes and so constructed and arranged as to control the angle of attack of said variable angle vanes to feather the latter to vary the speed of the driven member relative to the driving member.

8. A hydraulic coupling for varying the speed relationship between two rotating members, one of which is driven from the other, comprising at least one toroidal fluid filled container having generally radial vanes internally disposed therein, variable angle vanes protruding into the container to form part of the fluid circulating path defined by the generally radial vanes, said variable angle vanes having spindles extending in substantially parallel relation with respect to the axis of the driving member, a floating ring encircling and engaging said spindles to hold them in position on said driving member and operative to permit turning of said spindles about their axes, and means for adjusting the angle of attack of said variable angle vanes.

9. Apparatus as defined in claim 8 wherein the means for adjusting the angle of attack of the variable angle vanes includes a means responsive to driving torque which tends to feather said variable angle vanes, and a second means subject to external control which is adapted to unfeather said variable angle vanes in over-riding opposition to the effect of said driving torque.

10. Apparatus as claimed in claim 8 wherein the means for adjusting the angle of attack of the variable angle vanes includes means for feathering said variable angle vanes in response to the torque of the fluid in said container, and hydraulic means opposing said feathering motion of said variable angle means comprising a source of hydraulic pressure, a hydraulic motor operatively linked to said vanes, and means for varying the hydraulic pressure supplied to said motor whereby to control the speed of the driven member relative to the driving member.

11. Apparatus as defined in claim 8 wherein a portion of the toroidal container is associated with the driving member and a portion is associated with the driven member and wherein certain of said radial vanes are in the driven portion of the container, are reaction vanes and remain stationary while other of said radial vanes are carried by and rotate with the driven portion of the container.

12. A hydraulic coupling for varying the speed relationship between driving and driven members comprising at least one toroidal fluid container, variable angle vanes extending into said fluid container and having spindles rotatably supported on the driving member, a floating ring encircling, and engaging said vane spindles to hold the latter in position on said driving member while permitting them to turn about their axes, an adjusting gear adapted to synchronize the movements of said variable angle vanes, and means for variably balancing said variable angle vanes between torque forces tending to feather said vanes and control forces acting thereon to unfeather said vanes.

NATHAN C. PRICE.

REFERENCES CITED

The following references are of record in the file of this patent:

UNITED STATES PATENTS

| Number | Name | Date |
|---|---|---|
| 1,047,948 | Karminski | Dec. 24, 1912 |
| 1,900,120 | Lysholm | Mar. 7, 1933 |
| 2,117,673 | Lysholm | May 17, 1938 |
| 2,141,940 | Sinclair | Dec. 27, 1938 |
| 2,178,356 | Brunner | Oct. 31, 1939 |
| 2,194,715 | Nallinger | Mar. 26, 1940 |
| 2,287,374 | Dodge | June 23, 1942 |
| 2,292,482 | Roche | Aug. 11, 1942 |
| 2,333,674 | Powell | Nov. 9, 1943 |
| 2,379,183 | Price | June 26, 1945 |
| 2,380,681 | Wolfram | July 31, 1945 |

FOREIGN PATENTS

| Number | Country | Date |
|---|---|---|
| 536,735 | France | Feb. 17, 1922 |
| 94,287 | Switzerland | May 1, 1922 |